(No Model.)
G. M. HINKLEY.
WHEEL FOR BAND SAWS.
No. 353,260. Patented Nov. 23, 1886.
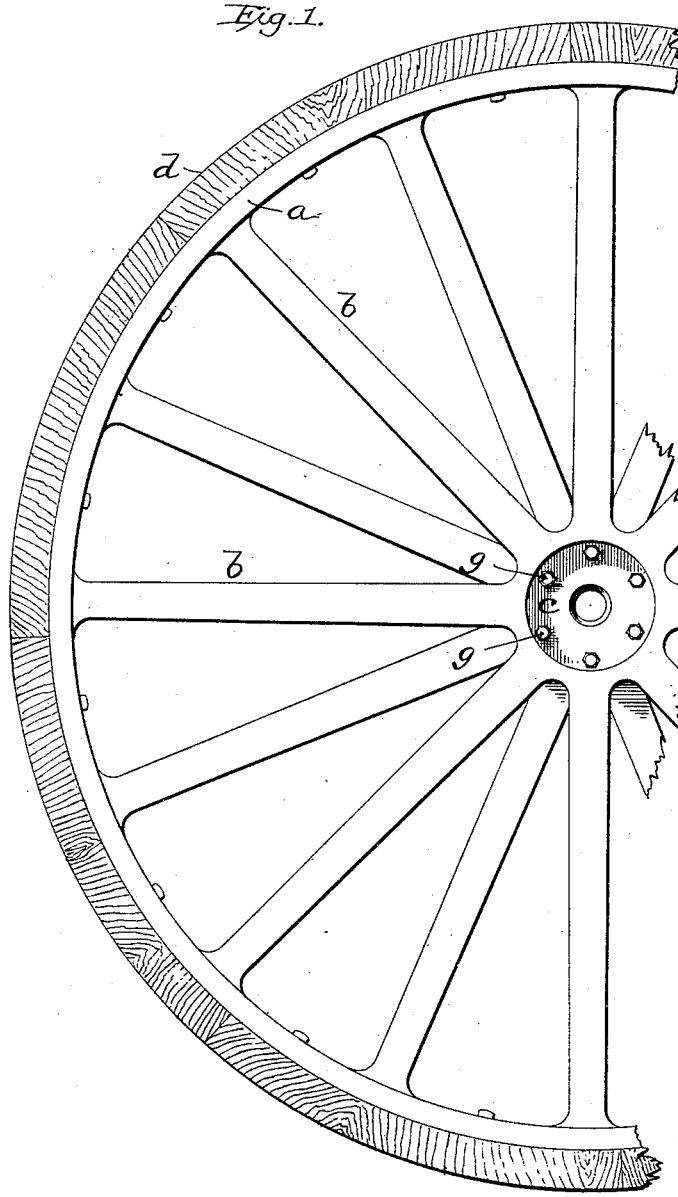
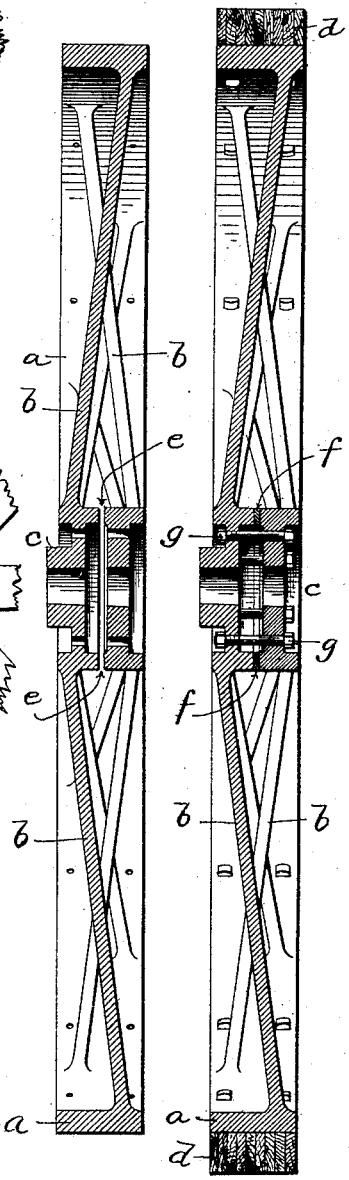
George M. Hinkley
Inventor;
Witnesses:

UNITED STATES PATENT OFFICE.

GEORGE M. HINKLEY, OF MILWAUKEE, WISCONSIN, ASSIGNOR OF ONE-HALF TO EDWARD P. ALLIS, OF SAME PLACE.

WHEEL FOR BAND-SAWS.

SPECIFICATION forming part of Letters Patent No. 353,260, dated November 23, 1886.

Original application filed April 6, 1886, Serial No. 198,002. Divided and this application filed July 22, 1886. Serial No. 208,741.

(No model.)

*To all whom it may concern:*

Be it known that I, GEORGE M. HINKLEY, of Milwaukee, in the county of Milwaukee and State of Wisconsin, have invented certain new and useful Improvements in Wheels for Band-Saws, of which the following is a specification.

My invention relates to a novel construction of cast-metal wheels; and it consists in various features and details, hereinafter set forth and claimed.

In the drawings, Figure 1 is a face view of a portion of the wheel, and Figs. 2 and 3 sectional views in a plane parallel with the axle.

The present invention is a division of the application upon which Letters Patent No. 348,281 were issued to me August 31, 1886.

The object of this invention is to so construct the wheel that it may be strong, and at the same time its construction cheapened and rendered easy.

The wheel consists of a rim, $a$, spokes $b$, and a hub, $c$, of iron, with a felly or tire, $d$, of wood, made up of segmental sections and applied to the outer face of the rim, as is usual. The spokes $b$ are arranged in two sets, which cross from side to side of the wheel, as shown, one set of the spokes forming a part of one cylindrical half of the hub, and the other set formed integral with the other half. It will be noticed that the hub $c$ is parted in the plane of rotation, so as to form an opening or space, $e$, between the two parts of the hub, as shown in Fig. 2. The object of parting or dividing the hub is to allow the rim of the wheel to contract in cooling without straining the rim or crushing the spokes.

It will be seen, upon examining the position of the spokes, that as the rim contracts and presses the spokes the opening or space between the two parts of the hub increases, thus preventing any undue strain on either the rim or the spokes after the wheel is cooled, the opening $e$ in practice being found to be sometimes two inches in width.

After the wheel is cast in the form shown in Fig. 2, with the space $e$ between the two faces of the hub-sections, the wheel, or at least the hub $c$, is placed again in a mold, and a ring, $f$, cast in the opening $e$, as shown in Fig. 3. When this is done, and before the wheel is finished, bolts $g$ are used to draw the two parts of the hub firmly together upon the ring $f$.

A wrought-metal ring or filling, or spacing ring or disk of wood or any other suitable material, may be placed between the hub-sections.

Having thus described my invention, what I claim is—

1. A metal wheel for band-saw mills, comprising a rim, a divided hub, and a series of crossed spokes, half of the spokes being secured to one part of the hub and the remaining spokes being secured to the other part of the hub, substantially as shown, whereby the entire wheel may be cast at one operation and provision made for contraction.

2. The herein-described metallic wheel, comprising rim $a$, parted hub $c$, and spokes $b$, extending from the rim alternately to the two parts of the hub, the rim, spokes, and hub forming a single casting, substantially as shown.

3. The herein-described saw-carrying wheel, comprising rim $a$, crossed spokes $b$, and parted hub $c$, cast integral, ring $f$, between the adjacent faces of the hub, and bolts $g$, connecting the two parts of the hub, substantially as shown.

GEORGE M. HINKLEY.

Witnesses:
WM. W. ALLIS,
EDW. P. ALLIS, Jr.